//USPAT
United States Patent

Gulick et al.

[15] 3,640,140
[45] Feb. 8, 1972

[54] ACTUATOR

[72] Inventors: Ronald A. Gulick, Sugarland; Charles H. Wicke, Richmond, both of Tex.

[73] Assignee: Research Engineering Company, Houston, Tex.

[22] Filed: June 2, 1969

[21] Appl. No.: 829,523

[52] U.S. Cl. .......................74/89.15, 74/424.8 VA, 251/71
[51] Int. Cl. .......................................................F16h 29/02
[58] Field of Search....................74/89.15, 509, 424.8 VA; 251/69, 68, 70, 71

[56] References Cited

UNITED STATES PATENTS

| | | | |
|---|---|---|---|
| 2,298,717 | 10/1942 | Nardone | 74/89.15 X |
| 3,063,298 | 11/1962 | Elliott | 74/89.15 |
| 3,147,766 | 9/1964 | Herring et al. | 74/89.15 X |
| 3,422,329 | 1/1969 | Anderson et al. | 251/69 X |

Primary Examiner—William F. O'Dea
Assistant Examiner—F. D. Shoemaker
Attorney—Robert W. B. Dickerson

[57] ABSTRACT

An actuating device comprising: a ball screw arrangement having an externally threaded screw and an internally threaded nut engageable with the screw through ball bearings, the nut being longitudinally movable along the screw on rotation of the screw. The screw may be mounted on support means for rotation only. Power means may be connected to the screw through clutch means for rotation thereof to drive the nut longitudinally thereon from a first position to another. The nut is connected to a rotatable member by a mechanism adapted to convert longitudinal movement of the nut to rotational movement of a portion of a device connected to the rotatable member. A spring return unit may be attached so as to exert a force against the nut. The spring return unit may be adapted on disengagement of the clutch to drive the nut back to its first position.

17 Claims, 1 Drawing Figure

PATENTED FEB 8 1972
3,640,140
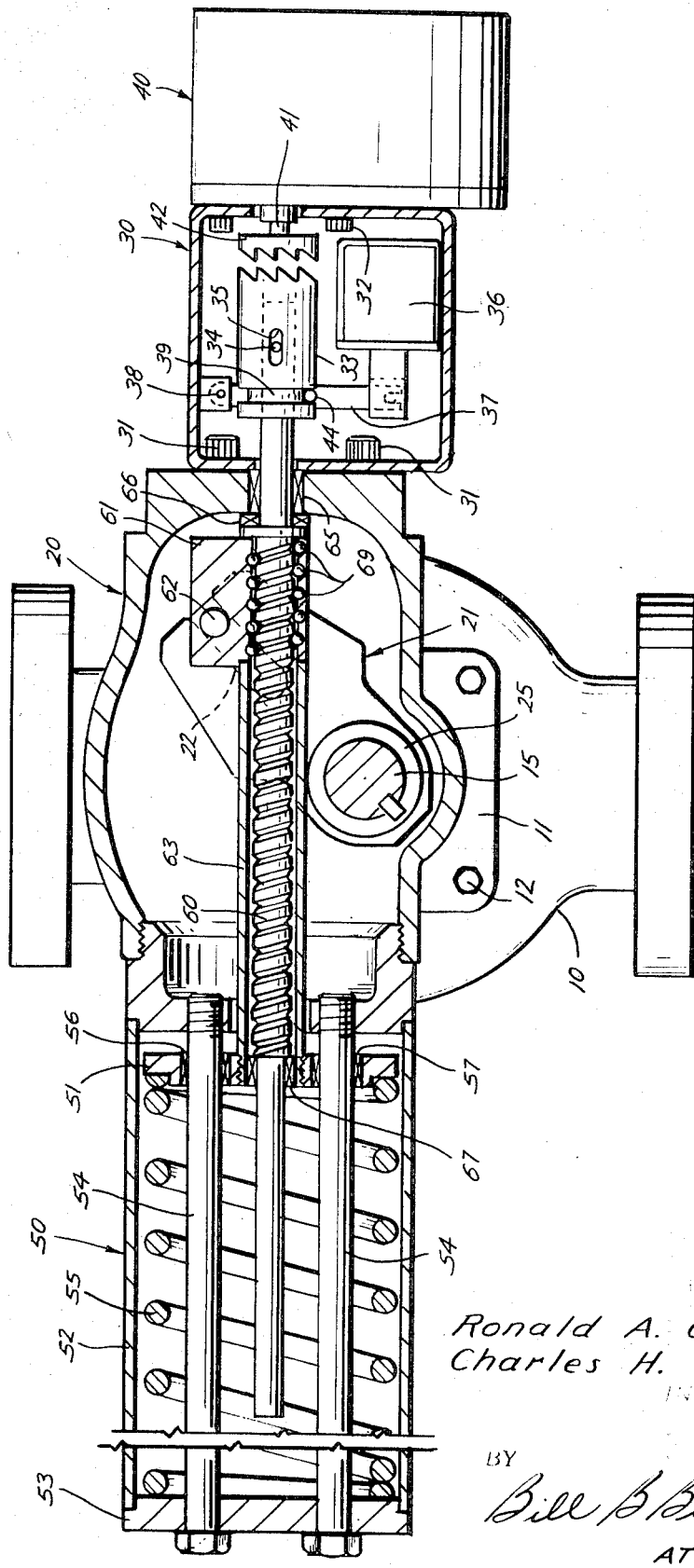
Ronald A. Gulick
Charles H. Wicke
INVENTORS
BY
Bill B Berryhill
ATTORNEY

{ ,640,140 }

ACTUATOR

BACKGROUND OF THE INVENTION

1. Field of the Invention

This invention relates to actuators primarily for use in operating valves. Specifically, it concerns a spring-return-type actuator which may be electrically actuated.

2. Description of the Prior Art

It is well known in the art to provide electric actuators for operating valves. Electric actuators are particularly suited for remote and automatic operation. Most electric actuators require switching circuitry for reversing the rotating direction of its electric motor in order to open and close a valve. Although this may involve a more complex design, the major disadvantage of such an actuator may be in its inability to fail safe in the event of power failure. Thus, a valve may remain in its opened or closed position at the wrong time. In certain applications this may be both expensive and hazardous.

SUMMARY OF THE INVENTION

In the present invention an electric actuator for operating a valve is disclosed which is capable of failing safe in the event of power failure. It utilizes an electric motor rotating in one direction only. The electric motor may be connected through a clutch unit to the screw of a ball-screw or similar overhauling thread mechanism. The nut of the ball-screw mechanism is attached to a yoke for operating a valve. Rotation of the screw by the motor causes the nut and valve stem to move. A spring return mechanism is connected to the ball-screw nut and on a signal or power failure, to disengage the clutch unit, returns the nut and valve stem to their initial positions. Other features of the invention pointed out in the claims can best be set forth in the description which follows.

BRIEF DESCRIPTION OF THE DRAWINGS

For a detailed description of a preferred embodiment of the invention, reference will be made to the accompanying drawing, but this is only exemplary of the invention which can be varied by one skilled in the art. The drawing selected for description is a plan view partially in section of a preferred embodiment of the invention.

DESCRIPTION OF THE PREFERRED EMBODIMENT

The actuator may be attached to valve 10 or any other device requiring approximately 90° rotational input which might be operated thereby by a mounting bracket 11 and bolts 12 or the like. The particular embodiment shown is for operating plug valves and similar valves which are operated by a 90° turn of the stem 15. However, it may be adapted for use with other type valves.

The actuator comprises a body portion 20, a clutch unit 30, motor and gear box assembly 40, and spring return assembly 50. Clutch unit 30 is connected between motor 40 and body 20 by cap screws 31, 32 or the like and through this clutch 30 the screw 60 of a ball-screw mechanism may be connected to motor 40 for rotation.

The construction and operation of ball-screw mechanisms are well known. However, this particular arrangement is believed to be unique. The nut 61 of the ball-screw mechanism is mounted within body 20 and attached to a yoke 21 by a pin 62 and slot 22 arrangement. As is well known, the screw 60 and nut 61 are provided with cooperating thread grooves in which are mounted ball bearings 69. As the screw rotates relative to nut 61 the nut moves longitudinally along screw 60 and ball bearings 69 are fed from one end of nut 61 to the other through a return tube (not shown). In this particular embodiment a hollow shaft or tube 63 is connected to nut 61 and mounted around screw 60 for longitudinal movement with nut 61. Screw 60 is mounted on radial bearing means 65 and thrust bearing means 66 at one end of body 20. The other end of screw 60 is mounted in a sliding bearing 67 of a circular spring pressure plate 51 which is connected to tube 63 for movement therewith.

In addition to spring pressure plate 51, spring return unit 50 comprises a cylindrical housing 52, cylinder head 53, a pair of guide rods 54, threadingly connected to body 20, and helical spring 55. Pressure plate 51 is mounted on guide rods 54 for sliding longitudinal motion within housing 52. Sleeve bearings 56, 57 reduce the sliding friction.

Clutch unit 30 comprises a sleeve engagement device 33 mounted on one end of screw 60 for limited longitudinal movement. A pin 34, attached to screw 60, and slot 35, in sleeve 33, allows this limited longitudinal movement but prevents rotation of the sleeve 33 relative to screw 60. Attached to the end of motor assembly output shaft 41 is a clutch hub 42. The adjacent ends of hub 42 and sleeve 33 are provided with engageable cooperating sawtooth members so that rotation of shaft 41 in one direction will drive screw 60. The slope of the sawteeth prevent reverse drive. Hub 42 and sleeve 33 are held in engagement by a solenoid 36. This is accomplished through a lever 37 which is pivotally connected at 38. Clutch sleeve 33 is provided with a groove 39 which slidingly receives a pin 44 attached to lever 37. Solenoid 36 may be connected in the power circuit in such a manner that when motor 40 is energized the solenoid 36 is also energized. When the solenoid 36 is energized it forces clutch sleeve 33 into engagement with clutch jaw 42. When solenoid 36 is deenergized lever 37 pivots away from motor 40 disengaging the clutch mechanism.

As shown in the drawing the actuator is in the position of beginning a power stroke. With power supplied to motor 40 and solenoid 36, the motor 40 drives or rotates the ball screw 60 through the engaged clutch. Ball-screw nut 61 is driven along screw 60 toward spring 55 causing yoke 21 to rotate in body 20. The hub 25 of yoke 21 is keyed to valve stem 15 causing it to also rotate and move the valve from a first position to a second position. As nut 61 is driven along screw 60 it also compresses spring 55 through tube 63 and spring pressure plate 51. When the actuator reaches its full travel position the power to the motor circuit only may be broken by a switch (not shown) actuated by yoke 21 at some specified degree of rotation. The clutch solenoid 36, remaining under power, holds the clutch in its engaged position. The construction of motor and gear train assembly 40 may be such as to not allow the force of spring 55 acting through screw 60 to rotate the motor in reverse when the power is off. At this point the actuator is at the end of its stroke.

If the power to solenoid 36 is now interrupted purposely or through power failure to solenoid 36 the clutch disengages the motor 40 and screw 60. The screw 60 now being free to rotate allows compressed spring 55 to drive ball nut 61 along the screw 60 to its original position. In this movement yoke 21 rotates to its original position causing valve stem 15 to assume its original position. The cycle is now complete.

Thus, it can be seen that through the ball-screw mechanism and clutch and spring assembly an electric operator may be provided to assure fail safe operation. This unique arrangement also eliminates the need for a reverse rotating motor and provides a relatively simple compact efficient actuator.

We claim:

1. An actuating device comprising: a ball-screw arrangement having a screw with external thread grooves and a nut with internal thread grooves engageable with said screw through ball bearings cooperatively received within said external and internal thread grooves, said nut being longitudinally movable along said screw on rotation of said screw relative thereto; support means on which said screw is mounted for rotation only; power means connected to said screw for rotation thereof to drive said nut longitudinally thereon from a first to a second position; a rotatable member mounted on said support means adapted for attachment to apparatus to be actuated; a mechanism connecting said nut and said rotating member adapted to convert longitudinal movement of said nut to rotary motion of said rotatable member; spring means mounted so as to bias said nut toward said first position;

said power means being connected to said screw through clutch means, said clutch means being disengageable to allow rotation of said screw, said spring means being adapted to force said nut along said screw from said second position toward said first position when said clutch is disengaged.

2. An actuating device comprising: a ball-screw arrangement having a screw with external thread grooves and a nut with internal thread grooves engageable with said screw through ball bearings cooperatively received within said external and internal thread grooves, said nut being longitudinally movable along said screw on rotation of said screw relative thereto; support means on which said screw is mounted for rotation only; power means connected to said screw for rotation thereof to drive said nut longitudinally thereon from a first position to a second position; a rotatable member mounted on said support means adapted for attachment to apparatus to be actuated; a mechanism connecting said nut and said rotating member adapted to convert longitudinal movement of said nut to rotary motion of said rotatable member; spring means mounted so as to bias said nut toward said first position; said spring means comprises a cylindrical housing attached to said support means and a helical spring mounted in said housing, one end of said spring bearing against a pressure plate, said pressure plate being connected to said nut by shaft means so that on movement of said nut from said first position to said second position said pressure plate moves longitudinally within said housing to compress said spring.

3. An actuating device as set forth in claim 2, characterized by a pair of rods fixedly and longitudinally mounted within said housing, said pressure plate having a pair of holes through which said rods pass in sliding engagement.

4. An actuating device as set forth in claim 2 characterized in that said shaft means comprises a hollow tube surrounding a portion of said screw and longitudinally movable thereon with said nut.

5. An actuating device comprising: body means, a ball-screw mechanism having a screw mounted longitudinally within said body for rotation only and a nut engageable with said screw through ball bearing means and longitudinally movable along said screw on rotation of said screw; yoke means mounted in said body means for rotation on an axis substantially perpendicular to said screw and adapted for attachment to apparatus to be actuated; a mechanism connecting said nut and said yoke adapted to convert longitudinal movement of said nut to rotary movement of said yoke; power means connected to said screw for rotation thereof to cause said nut to move longitudinally therealong from a first position to a second position; spring means mounted on said body adapted to bias said nut toward said first position, said power means being connected to said screw by clutch means, said clutch means being disengageable when said nut is in said second position to allow said spring means to return said nut toward said first position.

6. An actuating device as set forth in claim 5, characterized in that said power means comprises an electric motor and said clutch means comprises sleeve means, mounted on the end of said screw for limited longitudinal movement, and a solenoid, said sleeve means being connected to said solenoid by a pivoting link, said solenoid being adapted, when energized, to pivot said link and move said sleeve means longitudinally into engagement with a portion of said clutch connected to said electric motor.

7. An actuating device as set forth in claim 5, characterized in that said spring means comprises a spring mounted in an elongated housing attached to said body, said spring bearing against a pressure plate which is connected to said nut by a tube surrounding said screw, said tube and said pressure plate being longitudinally movable on movement of said nut from said first position to said second position to compress said spring, said spring being extendable on disengagement of said clutch means to drive said nut longitudinally along said screw to said first position.

8. An actuating device as set forth in claim 7, characterized in that a pair of guide rods are mounted longitudinally within said housing, said pressure plate being provided with holes therein through which said rods pass in sliding engagement therewith.

9. A valve actuator comprising: a body affixed to a valve; a ball-screw mechanism comprising a screw mounted within said body for rotation only and a nut engageable with said screw through ball bearing means and longitudinally movable along said screw on rotation of said screw; yoke means rotatably mounted in said body and adapted for attachment to the stem of said valve; a mechanism connecting said nut and said yoke adapted to convert longitudinal movement of said nut to rotational movement of said valve stem; an electric motor connected to said screw through disengageable clutch means for rotation of said screw to drive said nut longitudinally therealong from a first position to a second position.

10. A valve actuator as set forth in claim 9, characterized by a spring return assembly attached to said body having a spring exerting a force biasing said nut in a direction toward said first position whereby on disengagement of said clutch said nut is driven along said screw from said second position toward said first position.

11. A valve actuator as set forth in claim 10, characterized in that said spring is compressed between one end of an elongated housing and a pressure plate, said pressure plate being connected to said nut by a tube surrounding a portion of said screw.

12. A valve actuator as set forth in claim 11, characterized in that said spring return assembly is provided with guide means in engagement with said pressure plate preventing rotation thereof but permitting longitudinal movement of said plate within said housing.

13. An actuating device comprising: a housing portion capable of being affixed to a device to be actuated, a threaded first member mounted within said housing for rotation only, and a threaded second member engageable with said first member and movable therealong on rotation of said first member; a yoke device rotatably mounted in said housing and adapted to be attached to said device to be actuated; mechanism connecting said second member with said yoke device adapted to translate longitudinal movement of said second member into rotational movement of said yoke device; motor means connected to said first threaded member through disengageable clutch means for rotation of said first member and thereby causing said yoke device to rotate; and further including a spring device tending to bias said yoke device toward a first position.

14. The device of claim 13 and including combination means to cause connection and disconnection of said motor means through said clutch means, said clutch means including a pair of interlocking jaws with teeth of such configuration as to permit rotation of said first member by said motor means in only one direction.

15. The device of claim 14 wherein on said combination means being activated, and said motor means deactivated, the force exerted by said spring device is insufficient to cause rotation of said first member.

16. The device of claim 14, wherein said combination means, on activation, causes movement of one of said clutch jaws into interlocking connection with other jaw, and, on deactivation of such combination means, causes said one jaw to move out of such engagement.

17. The device of claim 16 wherein said combination means includes a solenoid.

* * * * *